United States Patent [19]
Wenderoth

[11] 3,917,390
[45] Nov. 4, 1975

[54] EFFECTIVE FOCAL LENGTH ADJUSTING ADDITIONAL LENS SYSTEM FOR MULTISPECTRAL CAMERA-PROJECTOR

[75] Inventor: Anthony Wenderoth, Northport, N.Y.

[73] Assignee: Spectral Data Corporation, Hauppauge, N.Y.

[22] Filed: Sept. 15, 1972

[21] Appl. No.: 289,442

[52] U.S. Cl. .................... 353/31; 353/84; 353/101
[51] Int. Cl.² .................... G03B 3/02; G03B 33/00
[58] Field of Search ....... 353/30, 31, 84, 94, 32–37, 353/82, 101

[56] References Cited
UNITED STATES PATENTS

| | | | |
|---|---|---|---|
| 973,961 | 10/1910 | Oliver | 353/33 |
| 973,962 | 10/1910 | Oliver | 353/31 |
| 1,654,391 | 12/1927 | Thornton | 353/101 |
| 1,949,892 | 3/1934 | Wright | 353/31 |
| 2,530,793 | 11/1950 | Thomas | 95/12.2 |
| 2,854,886 | 10/1958 | Stroud | 353/84 |
| 2,909,097 | 10/1959 | Alden | 353/31 |
| 2,967,459 | 1/1961 | Baur et al. | 350/220 |
| 3,352,200 | 11/1967 | Berger | 353/31 |
| 3,436,145 | 4/1969 | Bechtold | 350/215 |

*Primary Examiner*—Harry N. Haroian
*Attorney, Agent, or Firm*—Eliot S. Gerber

[57] ABSTRACT

An aerial camera for the simultaneous photography of ground features taken on a plurality of pictures on a single monochromic film uses a plurality of lenses and a filter for each lens, so that each photograph is in a different spectral band. A plurality of additional lens systems are provided to optically adjust each camera lens as to its effective focal length, enabling the use of a uniform film platen in the camera. Additional lens systems of the same design may be used to adjust the focal length of each of the lenses of a multispectral projector and viewer to provide clear and sharp images.

1 Claim, 9 Drawing Figures

EFFECTIVE FOCAL LENGTH ADJUSTING ADDITIONAL LENS SYSTEM FOR MULTISPECTRAL CAMERA-PROJECTOR

BACKGROUND OF THE INVENTION

In multispectral aerial photography a number of combinations of filters and lenses are used to simultaneously take a set of photographs on the same black-and-white film of the same scene in different bands of the visible and near-visible spectrum, usually in the range 360 to 900 nanometers. For example, one photograph would be taken in the infrared band simultaneously with other photographs in the red, green and blue color bands. The film is then developed and transparent positives or negatives are produced which are viewed by illuminating them with different colored lights using a projector or viewer. The images are superimposed, using additive color, to create a composite image in true or false color.

In one type of multispectral viewer, four separate photographs are positioned in accurately registered position on a 70 mm film. In one format the photographs are in a line because they are produced by a camera having four lenses in a row with the film fixed on a cylindrical plate and the lenses revolved to create a panoramic scene. In another format the centers of the pictures are at the corners of an imaginary parallelogram having two acute and two obtuse angles. The camera forming the parallelogram format of photographs has a focal plane roller blind shutter with four slit openings in the opaque cloth.

If the separate spectral photographs are inaccurately registered on the film, the resulting superimposed composite image may be blurred or inaccurate. Even if the operator recognizes that the separate photographs of the set are inaccurately aligned, and his viewer has a suitable mechanism to move the images in the X and Y and Z (depth of focus) directions, his adjustment of the images may be time consuming and inaccurate. The depth of focus adjustment of lenses used in additive color viewers only gives a small amount of adjustment in changing the effective focal length (EFL) in order to match the scale before resolution becomes degraded.

Part of the present inability to accurately register the separate spectral photographs is because of variances in the effective focal length of the camera lenses. Such variances are caused by manufacturing tolerances, in the glass and in the lens making process, and changes in focal length associated with different wavelengths of the radiation. This latter effect is particularly acute when using, at different times, visible and infrared filters on the same lens, in which case a noticeable change in the effective focal length (EFL) occurs.

One partial solution to the problem in panoramic cameras, of the rotating lens type, is to measure the EFL of each of the lenses and machine the platen in the radii exactly equal to the EFL of each lens. It has not been possible to mass-produce curved camera platens for the rotating lens type panoramic camera because of this necessity of matching the radii of curvature of the platen to the EFL of the particular lenses used. In any event, such platens, having parts of their lengths of different radii, do not solve the problem of the change in the effective focal length which occurs when the filter is changed.

SUMMARY OF THE INVENTION

It is consequently the objective of the present invention to provide a camera which accurately registers a set of spectral photographs on a film, with each photograph exactly in focus, and which permits changing of the filters for each lens while retaining the same effective focal length.

The camera consists of a number of adjustable additional lenses on a multi-lens aerial camera, which additional lenses may be adjusted in accordance with the particular filter which is selected to be used with each lens of the camera.

It is consequently another objective of the present invention that the additional lenses may be accurately, and yet readily, adjusted to accord with the filter selected for that lens.

DESCRIPTION OF THE PREFERRED EMBODIMENT

Figure 6:
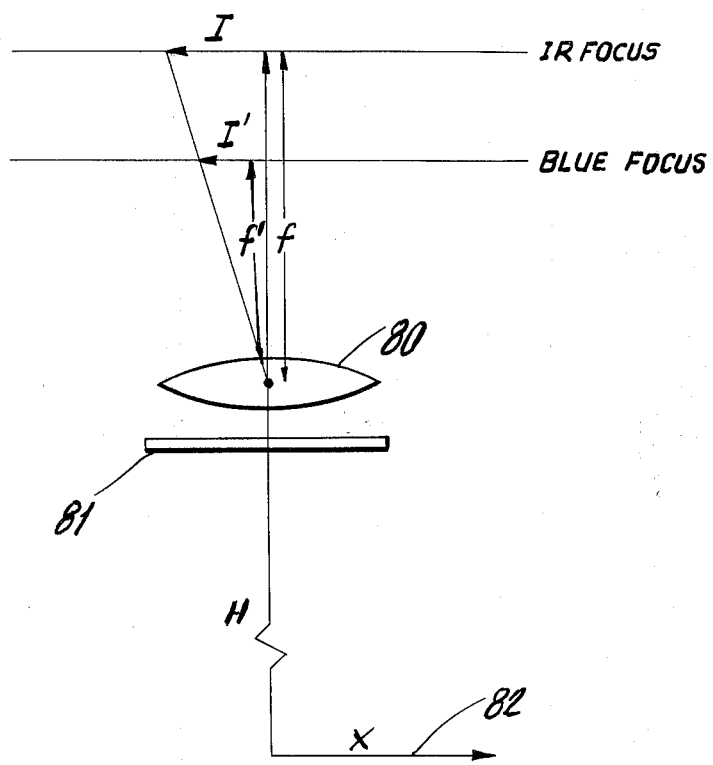
FIG. 6 is a schematic diagram illustrating the problem, in a multispectral camera, solved by the present invention.

In a conventional multispectral camera the focus of the common scene for each selected frequency band will differ. This causes the scale of each of the pictures to also differ. This problem is illustrated in FIG. 6, in which an idealized lens 80, one of the lenses of the multispectral camera, has a filter 81 placed between it and the ground scene 82 having $X$ dimension. The case will now be examined when filter 81 is changed from an infrared filter to a colored filter, for example, a blue filter.

By similar triangles $I = f(x/H)$ and $I = f'(x/H)$ where: $X$ = ground distance; $H$ = altitude above ground; $f$ = focal length of longer wavelength radiation; $f'$ = focal length of shorter wavelength radiation. The image dimensions $I$ and $I'$ differ for the same ground dimension $X$ because the focal length $f$ (associated with the infrared radiation passed by the infrared filter) is longer than the focal length $f'$ (associated with shorter wavelength radiation, for example, a blue filter). These different foci $f$ and $f'$ are required in order to focus the image of the ground for the different filters used.

A similar problem is presented in the case of a multispectral projector. It is assumed that multispectral photographs have been taken of a common scene, but they are at different scales for the reasons explained above. One solution, explained below, is to use adjustable lenses with the lenses of the multispectral camera. An alternative solution is to use adjustable lenses with the multispectral projector, which is a multi-lens projector projecting a superimposed image.

Figure 7:
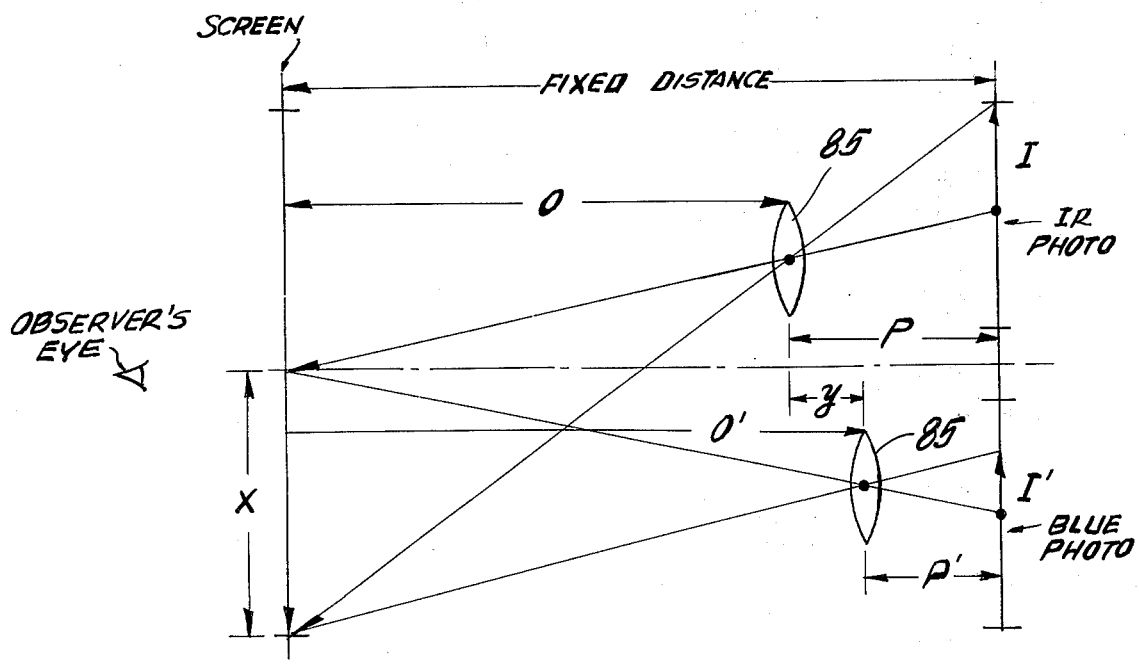
FIG. 7 is a schematic diagram illustrating the problem, in a multispectral viewer, solved by the present invention.

As shown in FIG. 7 the adjustable lenses 85 and 86 are adjustable in their distances $O$ and $O'$ from the observer's eye. The magnification $O/P$, for example 2, gives $O = 2P \neq O' =$ (assume) $5/2 P$. Using the basic lens equation $$\frac{1}{P} + \frac{1}{O} = \frac{1}{f} \quad \frac{3}{2P} = \frac{1}{f} \text{ or } f = \frac{2P}{3} \text{ (infrared photo)}$$

$$\frac{7}{5P} = \frac{1}{f'} \text{ or } f' = \frac{5P}{7} \text{ (blue photo)}$$

The objective is to magnify the dimension $I'$ on the blue multispectral photo more than the dimension $I$ on the infrared multispectral photo, with the constraint that the distance from the film to the screen is fixed, because both multispectral photos are on the same film base.

The node of the blue multispectral lens must be moved a distance $y$ toward the film compared to the position of the node of the lens which is projecting the infrared multispectral photo. This is accomplished, while maintaining the focus of the image on the screen, by decreasing the focal length of the lens projecting the blue multispectral photo, i.e., its focal length is made less than that projecting the infrared multispectral photo. The additional lens systems disclosed below accomplish this result.

Figure 1:
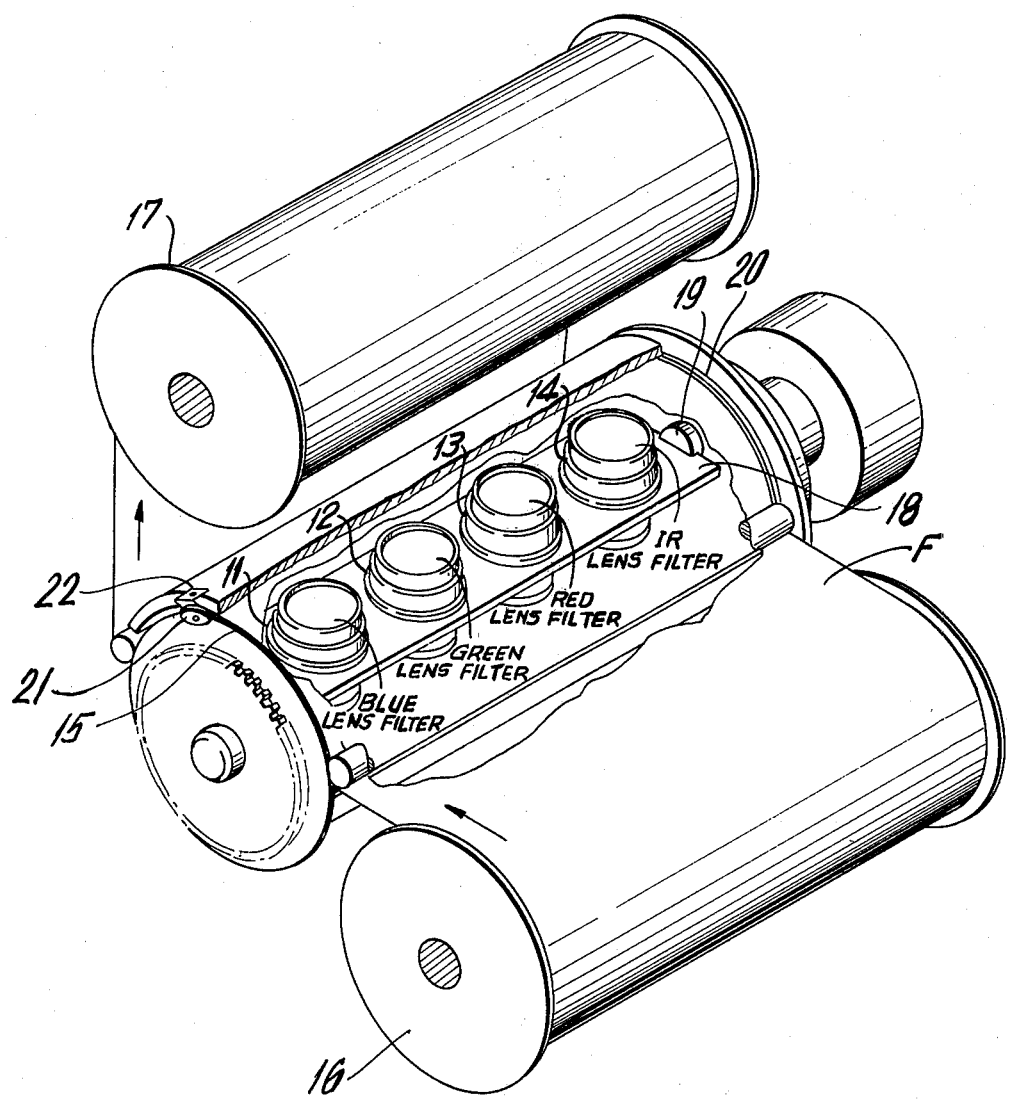
FIG. 1 is a perspective view of the multispectral camera of the present invention.

The multispectral camera of the present invention is shown in FIG. 1. In that camera a monochromic film F remains stationary on its supporting platen 15 during the taking of the scene and is moved between shots. The film F passes from the supply spool 16 over the platen 15 and to the take-up spool 17. The platen 15 is cylindrical, having a uniform diameter, and the film is held to the platen by a vacuum from a vacuum source (not shown). The lens-filter combinations 11, 12, 13 and 14 are mounted on support 18. The support 18 is oscillated by a motor (not shown) about the pivotal shaft 19 which is coaxial with platen 15. A reference flange 20, against which the film is indexed by means of roller 21 mounted on spring 22, aids in accurate registration. Each of the lens-filter combinations 11, 12, 13 and 14 consists of the lens system described below and a suitable filter.

An alternative camera, which is preferably also used with the lens systems described below, is described in applicant's copending application Ser. No. 842,133, filed July 16, 1969, and entitled "Multispectral Camera and Viewer."

In that camera the lenses have their optical centers at the corners of a parallelogram having two obtuse and two acute angles. The camera uses a focal plane shutter which is a cloth roller blind shutter having four slits.

Figure 2:
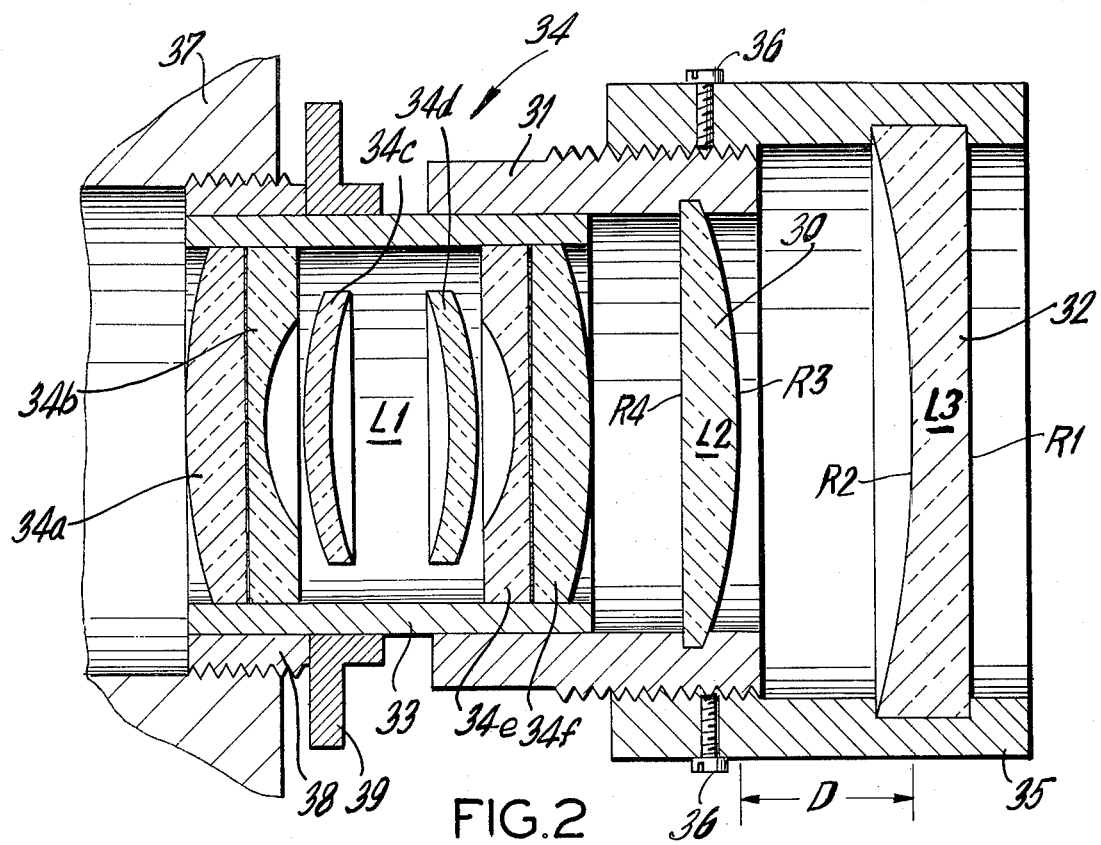
FIG. 2 is a side cross-sectional view of one of the adjustable lens systems of the present invention.

FIG. 2 shows the preferred embodiment of the additional lens system of the present invention, which additional lens system consists generally of two lenses and a mounting frame. The additional lens system, of the two lenses, is mounted on the regular lens system of the camera. The regular lens system 34 (L1) may be any suitable type, the type illustrated being a Schneider Xenotar lens system consisting of a convex-plano lens 34a adhered to a plano-concave lens 34b. The other lenses of that system are two convex-concave lenses 34c and 34d, and a concave-plano lens 34e adhered to a plano-convex lens 34f.

The additional lens 30 (L2) is a plano-convex lens which preferably is of spectacle crown glass number 58.6 and having a radii R3 of +523mm and a radii R4 of infinity (plano). The additional lens 30 is round (as seen in a top view) and mounted in a metal bushing 31. The bushing 31 is permanently attached to the mounting frame bushing 33 of the lens system 34. The lens system 34 is one of the original lens systems of a multi-lens multispectral camera.

The additional lens 32 is a plano-concave lens made of the same spectacle crown glass as lens 30 (No. 58.6) and has a concave radii R2 of −523mm and its other radius R1 at infinity (plano). Preferably the radii of the plano-concave and plano-convex lenses 30 and 32 are identical, as are their thicknesses (at their optical centers), which in this case is 3mm. However, it is not a necessary condition that their radii and thicknesses be equal, but it is a condition that typically results from the design. The lens 30 is permanently attached, preferably at 2 mm distance, from the vertex of the lens system 34. This attachment is always on the long conjugate side (the ground side of an aerial camera or the screen side of a multispectral viewer).

The lens 32 is fixed in a bushing 35 as shown in FIG. 2. The lens 32 distance with respect to the vertex of lens system 34 may be adjustably varied, preferably between 5 and 35 mm, which is the distance D. For this adjustment the lens 32 is fixed in the bushing 35 which telescopes with a screw threading on the bushing 31. In addition, a plurality of screws 36 are directed through internally screw-threaded shafts in bushing 35 and fix bushing 35 relative to bushing 31, after the desired variable distance D is obtained.

In addition to the axial adjustability of lens 32 over length D, the entire lens assembly, consisting of lenses 32 and 30 and their frame bushings and the lens system 34, is adjustably variable with respect to the mounting 37 of the camera. This provides an additional adjustment of about 5mm. For that purpose the bushing 33 is fixed to a ring 38 having fixed thereto a flange ring member 39, which acts as a stop. The ring 38, fixed to bushing 33, has external screw threads which mesh with the internal screw threads of the camera mounting 37.

Figure 3:
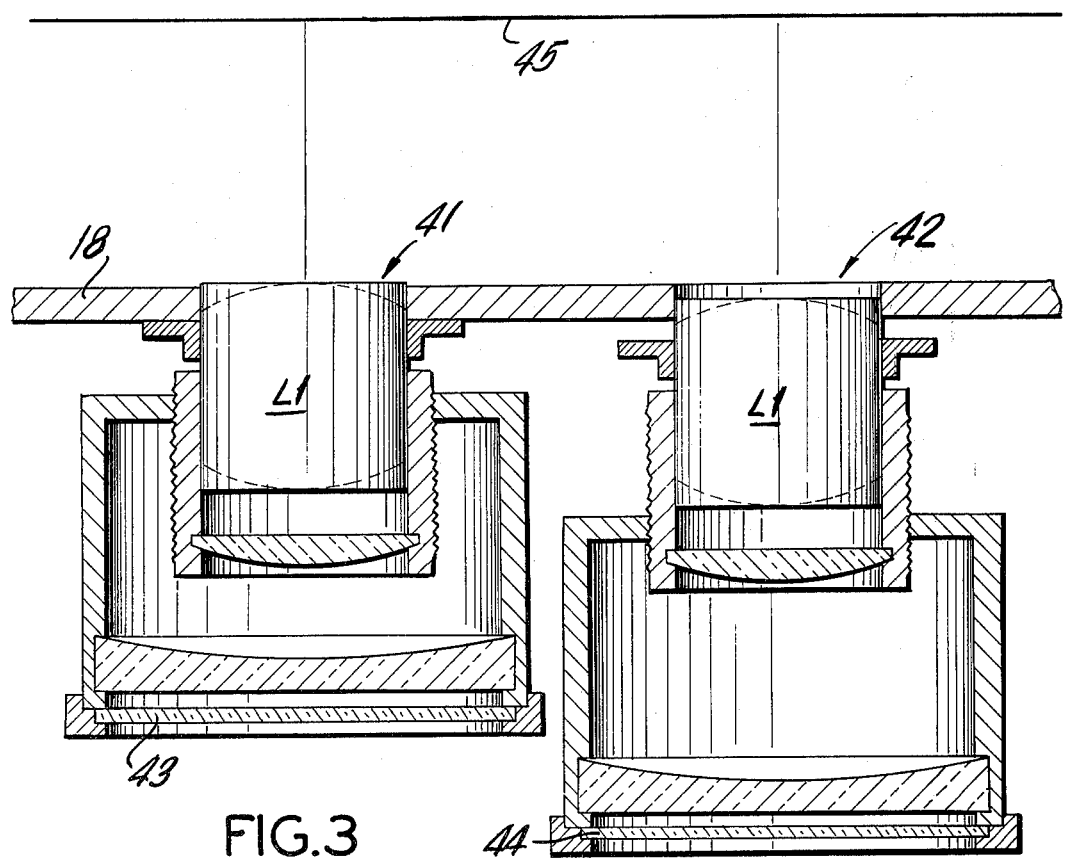
FIG. 3 is a side cross-sectional view showing two adjustable lens systems mounted in a multispectral camera.

FIG. 3 shows a typical arrangement of the adjustable lens system of the present invention in a multispectral camera using a flat platen 45. Two of the camera's main lens systems (L1) are shown at 41 and 42, although preferably the camera has four lens openings. The EFL of these two main lenses 41 and 42 will vary typically due to the tolerance in matching the focal lengths in manufacture, as well as to the introduction of optical filters 43 and 44. The additional adjustable lens system compensates for these two effects, in order to maintain the same scale in the film plane. By this means, it is possible to compensate for all the differences in EFL manufacture of lenses (for instance, the Schneider Xenotar lens system, which is the type illustrated) as well as for the introduction of optical filters in the visible and near-infrared portion of the photographic spectrum.

Figure 4:
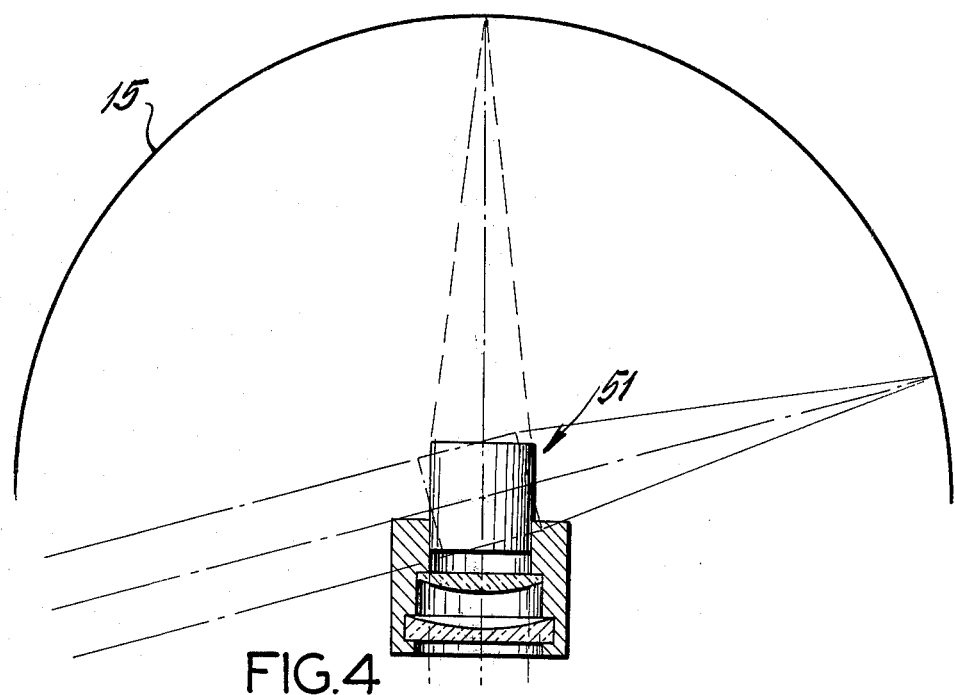
FIG. 4 is a cross-sectional schematic view showing one adjustable lens system mounted in a rotating lens panoramic camera.

FIG. 4 shows the cross-section of one lens system in the typical rotating lens panoramic camera of the type of FIG. 1, in which the radius of curvature of the platen 15 must exactly equal the effective focal length of the lens system 51 in order to prevent image blur. All the lenses of the camera can be brought to the same EFL by introduction of the adjustment lens system of the present invention, which will allow mass-manufacture of platens to a common radius. The adjustable lens system of the present invention provides compensation of plus and minus 2 percent in EFL of each of the lenses.

Figure 5:
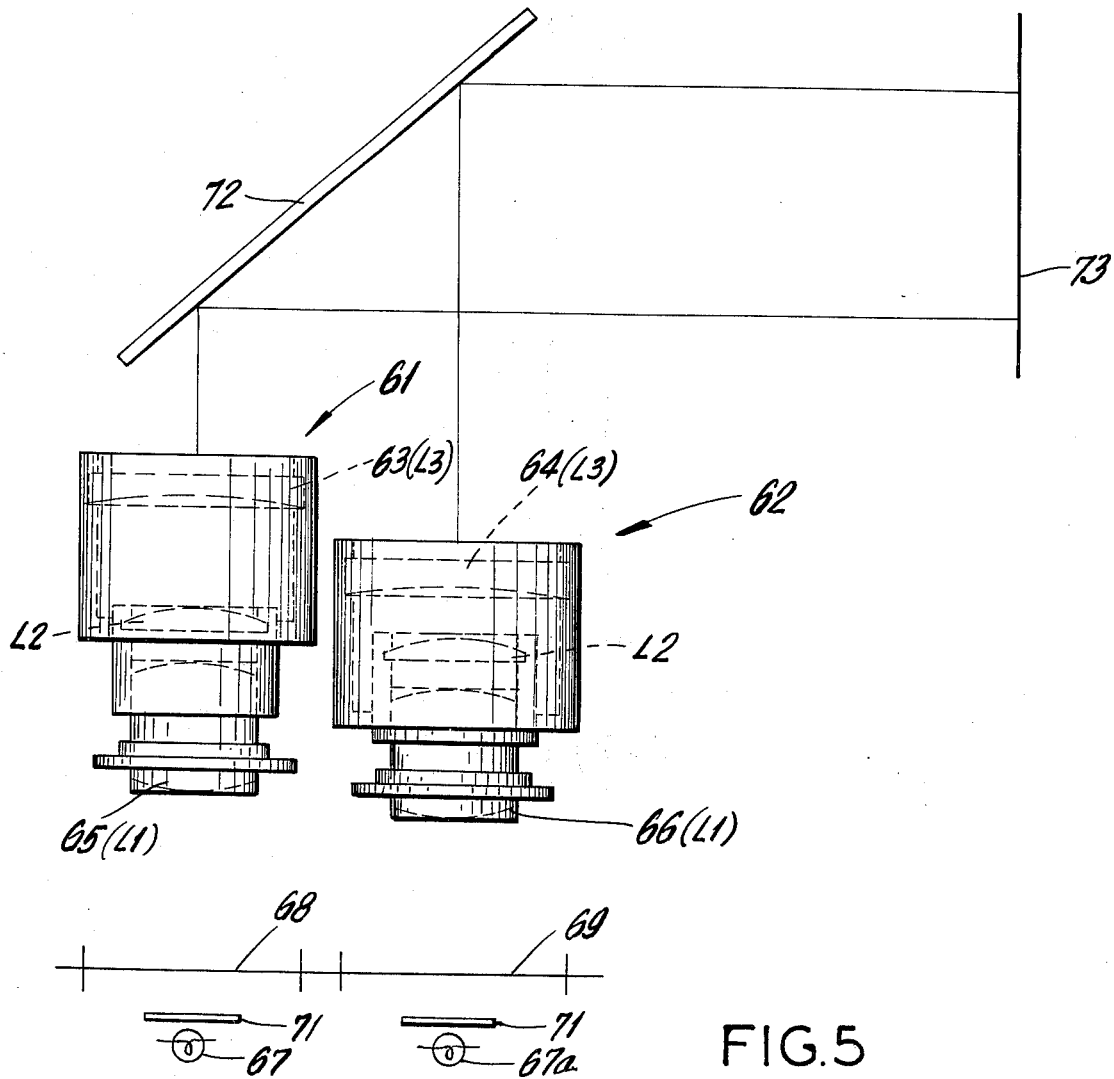
FIG. 5 is a schematic top view showing two adjustable lens systems in a multispectral projector.

FIG. 5 shows an embodiment of the adjustable lens system of the present invention in an additive color viewer. By using the adjustable lens system on each lens, it is possible to vary the scale of each picture taken with a multispectral camera and bring them to a common scale on the screen to produce an accurate superimposed image. Such variance of scale may be necessary if the camera does not use the adjustable lens system of the present invention. Such adjustment is accomplished by moving the lens assemblies 61 and 62 as a unit, and moving the lenses 63 and 64 (L3) with respect to lens assemblies 65 and 66 (L1). Further details about the projector are found in applicant's copending application Ser. No. 842,133, filed July 16, 1969, entitled "Multispectral Camera and Viewer."

In general, the bulbs 67, 67a illuminate the multispectral transparencies 68, 69 through filters 70, 71. The lenses 61, 62, through the images on mirror 72, reflect the composite superimposed image on screen 73.

It is emphasized that the translation of the lenses is linear and not rotational. This feature gives great tolerance in the centering of the radius of curvature and prevents introduction of distortion due to any non-centering in the manufacture of the lenses.

Figure 8:
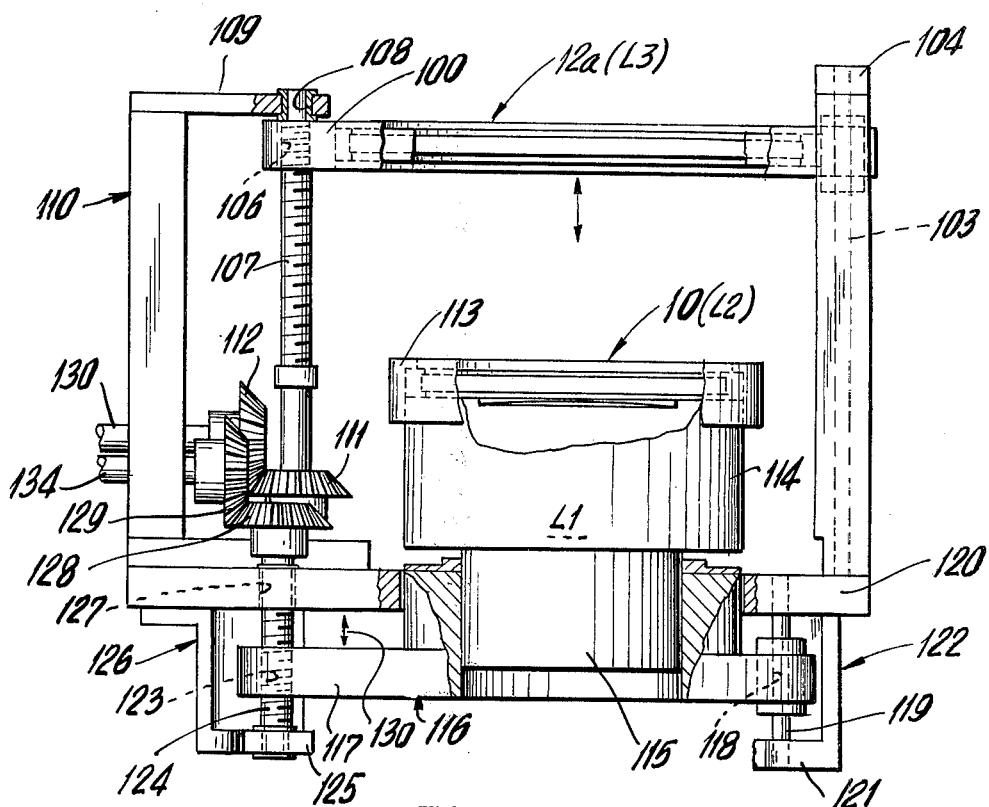
FIG. 8 is a side view of the adjustment mechanism, partially in section.
Figure 9:
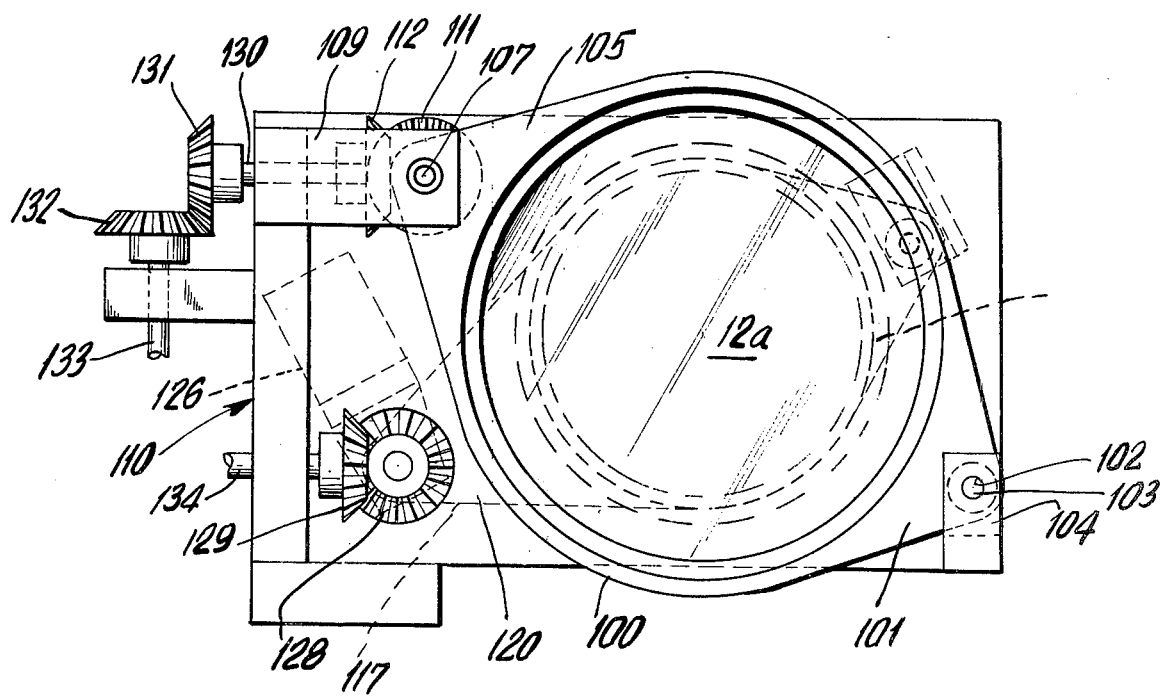
FIG. 9 is a top view of the adjustment mechanism of FIG. 8.

The detailed construction of the preferred embodiment is shown in FIGS. 8 and 9. As shown in FIG. 8, the lens 12a is plano-concave and is fixedly mounted in the metal ring 100. The metal ring 100 has a first flange 101 which is integral with the ring, the flange having therethrough a hole 102. A rod 103 protrudes through the hole 102, forming an axial bearing. Preferably rod 103 is coated with a suitable dry lubricant such as nylon or polytetrafluoroethylene. A stop 104, at the top of pillar 103, prevents excessive upward movement of the ring 100.

The ring 100 has a second integral flange 105, at the opposite side of the ring 100 to the flange 101. A hole 106 of the flange 105 has internal screw threads which mesh with the external screw threads of the rotatable shaft 107. The shaft, at its upper end, is freely rotatable within the hole 108 near the end of the arm 109, which is an integral portion of the support bracket 110. The shaft 107, at its bottom end, is fixed to pinion 111 which meshes with the pinion 112, with the two pinions being at right angles to each other. Rotation of the pinion 112 will cause rotation of the pinion 111 which, in turn, will rotate shaft 107, thereby moving the ring 100 upward or downward, i.e., towards or away from the stop 104, depending upon the direction of rotation of the pinion 112. Pinion 112 and pinion 131 are fixed to shaft 130. Pinion 131 meshes with pinion 132 which is fixed to shaft 133, the shaft 133 being rotatable by a knob (not shown).

The lens 10 is mounted in a ring 113, which ring is fixed at the top of a tubular lens bushing 114; that is, the lenses constituting the L1 lens system are mounted within the tubular bushing 114. The bushing 114 is fixed to a tubular bushing 115 having a smaller diameter than the diameter of bushing 114. The bushing 115 is fixed to a supporting ring 116 having an outwardly extending integral flange 117. The flange 117 has a first hole 118 therethrough. A rod 119 protrudes slidingly through hole 118, whose ends are fixed in a downwardly projecting flange 120 of the support bracket 110 and also in a flange 121 of a support bracket 122 fixed to the support bracket 110. A second hole 123 in flange 117 has internal screw threads which mesh with the external screw threads of a shaft 124. The bottom of the shaft 124 is freely rotatable in the flange 125 of the bracket 126, which bracket 126 is fixed to the support bracket 110. The shaft 124 is also freely rotatable within the hole 127 of the flange 120. The shaft 124 is fixed, at its upper end, to the slanted pinion 128. The slanted pinion 128 meshes with the second slanted pinion 129 which is at a right angle thereto. The pinion 129 is fixed to a shaft 134 which is rotated, through intermediate gears and shafts, by a knob (not shown). The rotation of the pinion 129 rotates the pinion 128 and its connected shaft 124. The ring 116 will move, either upward or downward, in one of the directions of the arrows 130, depending upon the direction of rotation of the pinion 129.

I claim:

1. An additive color multispectral viewer including at least three illuminating bulbs each producing a light beam, a changeable filter in each light beam, means to hold three or more pictures in the same image plane, each picture being positioned in each light beam, at least three projector lens systems each positioned in one of said light beams, at least three auxiliary lens systems each being connected to one of said projector lens systems, and a screen whose distance from the means which holds the pictures is a fixed distance, each of said auxiliary lens systems including a mounting frame, a first convex lens fixed to said frame, a second convex lens adjustably mounted on said frame, and means to move said second lens relative to said first lens along its axis with a motion parallel to the axis only and without rotation, wherein said second convex lens and said projection lens system are each mounted on a bracket member, said frame has support shaft means connected thereto and each bracket member has at least two holes therethrough through which support shaft means protrude, at least one of said support shaft means is threaded and meshes with screw threads of a bracket hole, said threaded shaft means is rotatably connected to said frame, and means are connected to said threaded shaft to rotate said threaded shaft means so as to adjust the positions of the second convex lens and the projection lens system.

* * * * *